United States Patent [19]

Miller

[11] Patent Number: 4,993,281

[45] Date of Patent: Feb. 19, 1991

[54] FLEXIBLE STEERING WHEEL HEAT SHIELD

[76] Inventor: Jess J. Miller, 220-C Lakewood Cir., Margate, Fla. 33063

[21] Appl. No.: 347,992

[22] Filed: May 5, 1989

[51] Int. Cl.⁵ .......................... G05G 1/04; G05G 1/10
[52] U.S. Cl. ...................................... 74/558.5; 74/558
[58] Field of Search ....................... 74/558, 558.5, 552; 70/209

[56] References Cited

U.S. PATENT DOCUMENTS

| | | | |
|---|---|---|---|
| 1,154,389 | 9/1915 | Fogalsang | 70/209 X |
| 1,202,734 | 10/1916 | Kirby | 74/558.5 X |
| 1,251,313 | 12/1917 | White | 74/558.5 X |
| 1,329,913 | 2/1920 | McGuire | 70/209 X |
| 1,351,303 | 8/1920 | Scott | 74/558.5 X |
| 1,927,913 | 9/1933 | Bennett | 74/558.5 |
| 1,987,599 | 1/1935 | Bennett | 74/558.5 |
| 1,997,738 | 4/1935 | Maxedon et al. | 74/558.5 |
| 2,601,881 | 7/1952 | Oberlin | 74/558.5 |
| 3,982,602 | 9/1976 | Gorman | 74/558.5 X |
| 4,102,377 | 7/1978 | Ostrem | 74/558.5 |
| 4,685,499 | 4/1987 | Black | 74/558 X |

FOREIGN PATENT DOCUMENTS

| | | | |
|---|---|---|---|
| 2622427 | 11/1977 | Fed. Rep. of Germany | 74/558 |
| 27322 | of 1905 | United Kingdom | 74/558 |
| 691836 | 5/1953 | United Kingdom | 74/558 |

Primary Examiner—Vinh T. Luong
Attorney, Agent, or Firm—Basile and Hanlon

[57] ABSTRACT

A steering wheel cover having an overlying front panel and a secondary rear panel attached thereto to form a pocket into which the associated steering wheel can be slidably and releasably received. The overlying front panel and seconary rear panel are each constructed from at least two sheets of metallized nylon having outer selvages bonded to each other to form at least one sealed air pocket. In the preferred embodiment, the overlying front panel also contains an intermediate insulating sheet completely contained within the two respective metallized sheets. The intermediate insulating sheet has a synthetic material base and an overlying layer bonded thereto. The overlying layer is attached to the base to form a plurality of individually sealed air pockets. The base of the intermediate insulating layer is attached to one sheet of metallized plastic, while the second sheet of metallized plastic overlays the intermediate insulating layer to form a large air pocket therebetween.

12 Claims, 1 Drawing Sheet

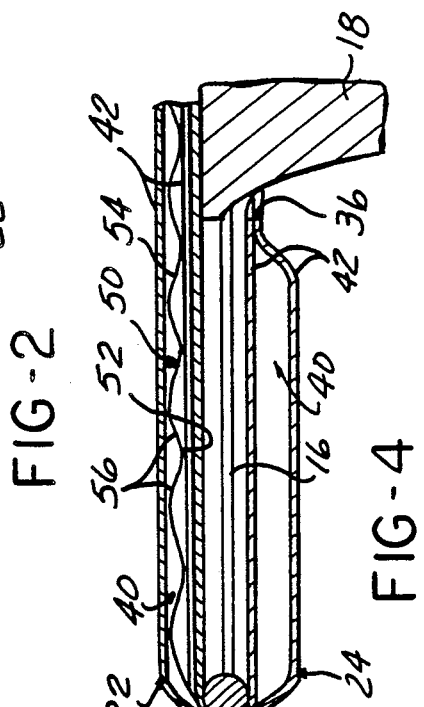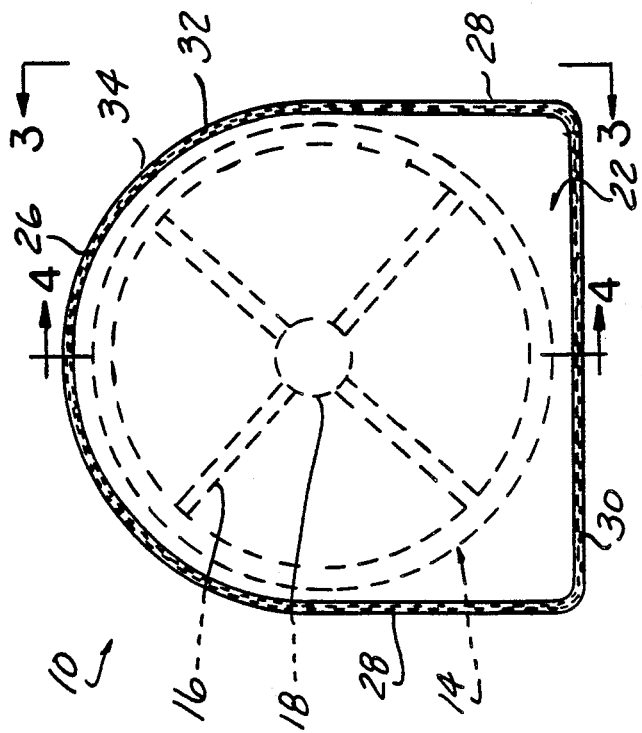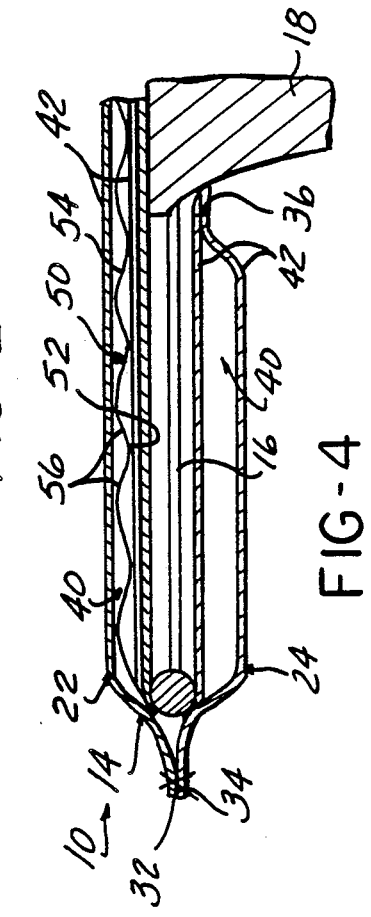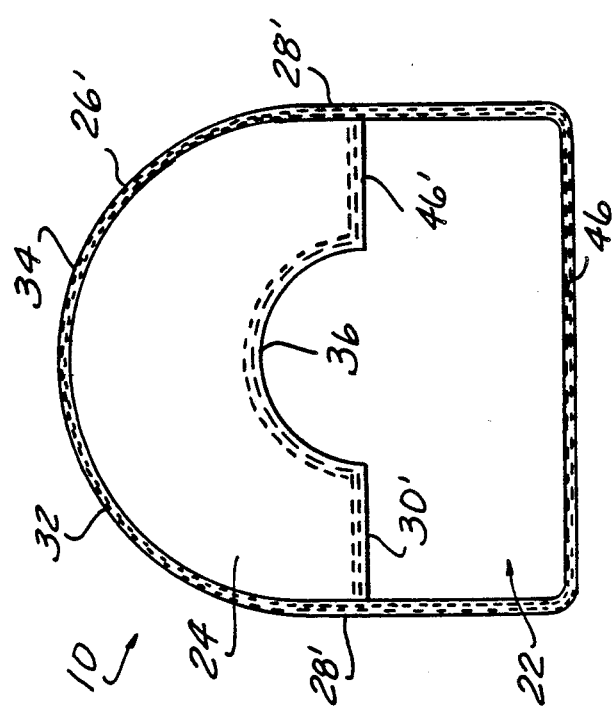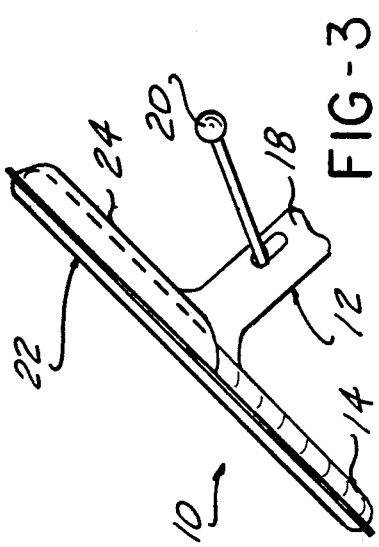

FLEXIBLE STEERING WHEEL HEAT SHIELD

BACKGROUND OF THE INVENTION

I. Field of the Invention

This invention relates, generally, to devices which cover automotive steering wheels to prevent the penetration of ultraviolet light and heat to the wheel. More particularly, this invention relates to flexible, compact detachable devices which have a reflective surface and are designed to overlay steering wheel surfaces in a secure manner.

II. Description of the Relevant Art

Various devices have been proposed for increasing occupant and driver comfort in automobiles and other vehicles. One such area in which driver comfort can be increased is the automobile steering wheel. An automobile steering wheel quickly becomes very hot to the touch when exposed to the sun. This is particularly true of metallic steering wheels. In order to overcome this problem, automobile manufacturers and other aftermarket equipment suppliers have produced a variety of automobiles having cushioned heat-absorbent surfaces which remain somewhat cooler to the touch. These steering wheels still become unpleasantly hot, however. Additionally, use of polymeric cushioning material presents the added problems of degradation when the materials are exposed to excessive heat and ultraviolet radiation which is generally associated with sunlight.

A variety of steering wheel covers which remain constantly affixed to the steering wheel have previously been proposed. These covers are generally bulky and do not remain firmly attached to the steering wheel thereby resulting in driving difficulties.

In order to overcome such problems, various attempts have been made to produce removable steering wheel covers. U.S. Pat. No. 4,102,377 to Ostrem discloses a steering wheel cover which overlies the rear of the top section of the steering wheel and the entire upwardly facing area of the steering wheel. This device is made of an open celled synthetic plastic foam secured to the inner surface of a cover sheet constructed from scorch resistant synthetic plastics. The layer of open celled synthetic foam directly abuts the steering wheel to insulate the steering wheel from excessive heat.

U.S. Pat. No. 2,601,881 to Oberlin teaches a steering wheel cover used to protect the steering wheel from dirt or grease when the automobile is being serviced. This device overlays the steering wheel and is made of a suitable flexible material, such as cloth, paper or the like. The Oberlin device lacks any teaching of insulative qualities which would be necessary to protect the steering wheel from heat and excessive radiation.

Similarly, British Patent Application No. 27322 to Scott discloses a semi-permanent steering wheel cover constructed from leather, canvas, celluloid or metal fur. The device conforms to the contour of the steering wheel and is designed to remain permanently attached to the wheel. The driver can insert his hands inside the device to keep his hands warm during open air driving. These devices present numerous drawbacks. The Oberlin device includes an open celled insulating material in direct contact with the steering wheel. The open celled material is bulky and will break down upon repeated heating, cooling and attempts to fold the material. The resulting breakdown will yield particulate foamed material which can dissociate from the shield and cause unpleasant littering in the passenger compartment of the automobile. Additionally, because the device is bulky, it cannot be removed and compactly folded when the car is in use. This is a particular problem in modern small cars where storage space is at a minimum.

Similar problems present themselves with the Scott and Oberlin devices. The Scott device is also quite bulky which makes it unable to be removed quickly and stored competently. The Oberlin reference does not provide any insulative characteristics.

Thus, it would be desirable to provide an automotive steering wheel heat shield which has extremely high insulative characteristics while being able to be compactly folded and stored in an automobile glove compartment or other storage area. It would also be desirable to provide a device which would not crack, tear or otherwise decompose upon continuous heating and cooling, as well as continuous folding and unfolding. It would also be desirable to provide a device which could be readily positioned on a steering wheel and just as readily removed when desired. Finally, it would be desirable to provide a device which is economical to construct and purchase.

SUMMARY OF THE INVENTION

In accordance with the present invention, a steering wheel heat shield is disclosed for reducing the absorption of heat and ultraviolet radiation on steering wheel surfaces. The removable steering wheel heat shield of the present invention is composed of at least two structured flexible sheets attached to one another to form a suitable central pocket. At least one of the structured flexible sheets has dimensions equivalent to or larger than the associated steering wheel. Preferably, each individual structured flexible sheet has a plurality of separate joined layers suitably fastened to one another to form air pockets therebetween.

In the preferred embodiment, the steering wheel cover has an overlying front panel having outer dimensions larger than the associated steering wheel and a secondary panel permanently attached to the front panel along a portion of its outer edge. The attached secondary panel is joined to the overlying front panel in a manner forming a pocket into which the associating steering wheel is slidably and releasably received.

Both panels are, preferably, formed of layers of a flexible light impervious metallized plastic film. Each layer of the metallized plastic film has at least one highly reflective surface. In the preferred embodiment, the layers of metallized plastic film are positioned such that a highly reflective surface is positioned facing outward from the outer surface of each respective panel. The layers of metallized plastic film will reflect large amounts of solar radiation including increased amounts of ultraviolet radiation.

The layers of metallized plastic film are also essentially gas-impervious. Thus, air pockets formed between the layers of each of the respective panels provide insulation characteristics which increase the insulative value of the steering wheel heat shield without appreciably increasing the thickness or weight of the device. Thus, the removable steering wheel cover of the present invention is a light-weight device for preventing heat build-up and ultraviolet degradation of the steering wheel material.

In the preferred embodiment, an intermediate insulating sheet is contained between the metallized plastic layers in the overlying front panel. The intermediate insulating sheet is composed of a synthetic material base and an overlying layer bonded thereto. The overlying layer is attached to the base in a manner forming a plurality of individually sealed air pockets. The intermediate insulative sheet is contained in the air space defined by the layers of metallized plastic within the larger air pockets defined by the metallized plastic sheets. The intermediate insulative sheet provides additional insulation characteristics to increase the insulative value of the removable steering wheel cover without compromising characteristics such as weight, thickness or flexibility.

When in place, the removable steering wheel cover of the present invention is preferably adapted to overlay the outer rim of the vehicle steering wheel with the front panel overlying the entire area of the outer surface of the steering wheel. The secondary panel is adapted to overlay the rear portion of the steering wheel between the wheel itself and the vehicular dashboard. In the preferred embodiment, the secondary panel is adapted to extend from the uppermost portion of the steering wheel down to the steering column.

When the vehicle is to be operated, the removable steering wheel cover can be lifted from the steering wheel and can be compactly folded and stored in a suitable storage container such as the automobile glove compartment or the like. It has been found that the addition of the intermediate insulative sheet permits the reflection of any unwanted solar radiation which can cause heat build-up. Additionally, the use of such an automotive steering wheel cover permits the retention of residual heat in colder climates.

BRIEF DESCRIPTION OF THE DRAWINGS

Throughout the various figures of the drawing, like reference numerals are used for like elements. In the drawing:

FIG. 1 is a rear plan view of the steering wheel heat shield of the present invention;

FIG. 2 is a front view of the heat shield of the present invention showing a representative steering wheel in phantom;

FIG. 3 is a side view of the heat shield of the present invention in place over an associated steering wheel; and FIG. 4 is a cross-sectional view of the heat shield taken along the 4—4 line in FIG. 2.

DESCRIPTION OF THE PREFERRED EMBODIMENT

Referring to FIGS. 1, 2 and 3, there is shown an automotive heat shield 10 of the present invention. In particular, in FIGS. 2 and 3, the heat shield 10 of the present invention is shown in overlying relationship with steering wheel assembly 12. The steering wheel assembly 12 generally includes a wheel portion 14, central spokes 16, a steering column 18 and associated driving levers 20. The steering wheel shield 10 of the present invention is adapted to generally overlay the steering wheel portion 14.

The steering wheel shield 10 generally includes an overlying front panel 22 and a secondary rear panel 24. The overlying front panel 22 has dimensions larger than an associated steering wheel 14. The outer edge of overlying front panel 22 has a curved region 26 defining at least a portion of the outer edge. In the preferred embodiment, the overlying front panel 22 also has parallel opposed side edges 28 contiguous with the curved region and a lower edge 30 opposed to the curved region 26 and perpendicularly disposed between the side edges 28.

The secondary rear panel 24 is permanently attached to the overlying front panel 22 and forms a pocket therebetween. In the preferred embodiment, the rear panel 24 has an upper curved region 26' which conforms to curved region 26 of the overlying front panel 22, two parallel side edges 28' continuous to the curved region 26', and an opposed lower edge 30'. The distance along the side edges 28' between the curved region 26' and the lower edge 30' is approximately one-half of the distance between curved region 26 and lower edge 30 on the associated overlying front panel 22. Attachment between the overlying front panel 22 and the secondary rear panel 24 occurs in an area proximate to the outer edges and runs continuously from the lower edge 30 of the secondary rear panel 24 along the respective side edges 28, 28', curved regions 26, 26' and opposed side edge 28, 28'. The means for attachment between the front panel 22 and rear panel 24 can be any suitable means such as a conventional sewn seam, chemical adhesive or other bonding methods. In the preferred embodiment, the front panel 22 is sewn directly to the rear panel 24 by a plurality of parallel seams 32 located in close proximity to the overlapping outer edges. In the preferred embodiment, the seam allowance 34 formed by the parallel seams 32 extends outwardly from the edge of the automotive steering wheel heat shield 10. The seam allowance 34 forms a convenient region for grasping the heat shield 10 for removal from steering wheel assembly 12. The seam allowance 34 with associated seams also stiffens the heat shield 10 giving it a firm yet flexible structure.

The secondary rear panel 24 may have any configuration desired. In the preferred embodiment, the secondary rear panel 24 has an outer configuration which, generally, corresponds to the overall outer configuration of the overlying front panel 22. As indicated previously, the general height of the secondary rear panel 24 from curved region 26' to lower edge 30' is less than that of overlying front panel 22.

The lower edge 30' of secondary rear panel 24 may have any suitable contour. In the preferred embodiment, the lower edge 30' has a centrally located concave indentation 36 adapted to releasably surround the upper portion of steering column 18 as shown in FIGS. 3 and 4 in a manner which will be described in greater detail subsequently.

The front panel 22 and the rear panel 24, respectively, are both constructed from flexible, multi-ply structured sheets which are impervious to the passage of light and ultraviolet radiation. Each light impervious, multi-ply structured flexible sheet has at least two individual layers of a light impervious material such as metallized plastic film. The various layers are continuously joined at the outer peripheral selvages of the layers to form the single multi-ply flexible sheet.

In joining the layers, one or more air pockets 40 are formed in the interior of the structured multi-ply flexible sheet. These air pockets 40 can extend along large areas of the interior of the respective panels 22, 24. The air pockets 40 provide a "dead air" space which greatly enhances the insulative value of the respective panels 22, 24 and the associated steering wheel heat shield.

In the preferred embodiment, each panel 22, 24 is comprised of at least two layers 42 of metallized plastic film to form the structured flexible sheet. Metallized plastic film suitable for this invention is commercially available from Phoenix Films Inc., Clearwater, Fla. The individual sheets have a thickness between about 12 microns and about 15 microns. The metallized plastic film is, preferably, selected from the group consisting of metallized nylon, metallized polyethylene, metallized polyester, metallized polypropylene, metallized polycarbonate, metallized polysulfone, and mixtures thereof. In the preferred embodiment, metallized nylon is employed. However, it is to be understood that layers of different material can be combined and used.

The metallized plastic film employed in the present invention generally has a highly reflective side and a less reflective side. The highly reflective side is generally due to the deposition of metal onto a plastic substrate in certain situations. The deposited metal can exhibit great sensitivity to moisture. Excessive amounts of water can cause the metal to oxidize and, possibly, compromise the life span of the finished automotive steering wheel heat shield 10. Thus, the metallized plastic layers are generally oriented such that the metal surface is oriented on the interior of each flexible multi-ply structured sheet where multiple layers of metallized plastic flim are employed.

The metallized plastic film can also be coated with a polymeric coating prior to construction of the respective panels 22, 24. The coating is preferably a thermoplastic material such as polyethylene. The polymeric coating can be located on either or both sides of the plastic film. Preferably, when used, the polymeric coating overlays the deposited metal surface to protect it from abrasion and wear.

The various layers 42 of metallized plastic employed in the present invention can be joined in any suitable manner to form the respective panels 22, 24. The layers may be fusion-sealed by applying a heat source along a continuous line to form a heat seam adjacent to the outer peripheral selvages of the various layers 42. Preferably, a plurality of fusion seams will be spaced parallel to the peripheral selvage. The fusion seams serve to form and seal the insulating air pocket or pockets and provide a flexible strengthened reinforced region 34 in the curved region 26, 26' of the automotive steering wheel heat shield 10 of the present invention. This strengthened reinforced region 34 can be used to grasp the automotive steering wheel heat shield 10 when it is to be removed from the steering wheel assembly 12. Because the fusion seams extend around the entire body of the respective panels 22, 24, an additional strengthened reinforced region 46, 46' extends along the respective lower edges 30, 30' and side edges 28, 28' to assist in maintaining the shape and structure of the entire automotive steering wheel heat shield 10 when it is placed in overlying contact with a respective steering wheel assembly 12 while permitting the automotive steering wheel heat shield 10 to be suitably folded and stored when necessary. This type of reinforcement eliminates the necessity for extensive fastening means, supplemental reinforcement devices or stiffening devices.

The heat fusion can be accomplished by the use of heat activated adhesives applied in the appropriate reinforcement regions. Where metallized plastic film with a thermoplastic polymeric coating is employed, the thermoplastic properties of the coating can be used to achieve fusion sealing with or without activated adhesives. The individual layers of the flexible multi-ply sheet may also be joined by any other manner desired. Fastening can also occur by sewing, use of conventional non-heat activated adhesives and the like. It is also possible that the various methods enumerated can be used in conjunction with each other. For example, the layers may be fusion-sealed to form a reinforcement region which also contains at least one threaded seam, preferably, located within the area of fusion. This seam further aids in the reinforcement and prevents the tearing and separation of the layers which make up each individual flexible multi-ply sheet.

In the preferred embodiment, an intermediate insulating sheet is disposed between the metallized plastic layers 42 in the flexible multi-ply sheet which is used to construct the overlying front panel 22 as shown in detail in FIG. 4. In the preferred embodiment, the intermediate insulating sheet 50 is comprised of a synthetic material base sheet 52 with an overlying layer 54 bonded thereto. The overlying layer 54 is bonded to the base sheet 52 in a manner which forms a plurality of individually sealed air pockets 56 located along the entire length and breadth of the intermediate insulating sheet 50. The intermediate air pockets 56 provide additional, self-contained insulative capacity within the overlying front panel 22. In the preferred embodiment, the intermediate air pockets 56 are placed in spaced relationship from one another to permit folding and bending of the steering wheel heat shield 10. The intermediate insulating sheet 50 can be constructed from suitable synthetic plastic materials.

In the preferred embodiment, the intermediate insulating sheet is encased within the flexible multi-ply sheet with the layers 42 fused together therearound. Alternately, it is to be understood that the intermediate insulating sheet 50 can also be attached to one associated layer 42 of metallized plastic by any suitable means such as adhesive bonding, sewing or heat fusion in a manner such as was described previously. An overlying layer 42 of metallized plastic is suitably bonded to the intermediate insulating sheet 50 and associated layer 42 to form air pockets (not shown) between the intermediate insulating sheet 50 and the interior of the respective layers 42 of metallized plastic. Thus, the flexible multi-ply structured sheet which comprises the overlying front panel 22 includes at least two layers 42 of metallized plastic with an intermediate insulating sheet 50 interposed therebetween in a single large air pocket. While in the preferred embodiment of the present invention, only the overlying front panel 22 includes the intermediate insulating sheet 50, it is within the purview of this invention to so equip the secondary rear panel as well.

In the present invention, the flexible multi-ply structured sheets which define the overlying front panel 22 and secondary rear panel 24 can be attached to one another by any suitable means, such as heat-fusion seams, sewn seams or the like. These attachment points are generally located along the upper curved region 26, 26' of the automotive steering wheel heat shield 10 adjacent to the outer edge of the respective flexible multi-ply sheets. In the preferred embodiment, the overlying front panel 22 is directly attached to the secondary rear panel 24. However, it is within the purview of this invention to have an intermediate piece continuously attached between the respective panels 22, 24.

When in use, the automotive steering wheel heat shield 10 of the present invention overlies the steering wheel portion 14 of a suitable steering wheel assembly 12 with the secondary rear panel 24 positioned along the steering wheel between the steering wheel surface and associated dashboard (not shown). The concave indentation 36 of the secondary rear panel 24 rests on the steering column 18 of the associated steering wheel assembly 12. The overlying front panel 22 extends over and around the front portion of the steering wheel to completely cover the steering wheel portion 14, as well as central spokes 16 and interior of steering column 18.

When in position, the automotive steering wheel heat shield of the present invention affectively insulates the steering wheel from increases in temperature or ultraviolet radiation. The automotive steering wheel heat shield of the present invention can be removed from the associated steering wheel assembly 12 by slidably moving it from engagement with the steering wheel portion 14. The automotive steering wheel heat shield of the present invention can then be readily folded and stored in a glove compartment or other suitable container or holder.

Having thus described the present invention, what is claimed is:

1. A steering wheel cover removably positionable on a steering wheel, the steering wheel cover comprising:
   an overlying front panel having an outer edge and outer dimensions larger than the steering wheel; and
   a secondary rear panel attached to the overlying front panel along a portion of the outer edge, the attached secondary panel forming a pocket into which the steering wheel can be slidably and releasably received;
   the overlying front panel and the secondary rear panel each constructed from at least two sheets of metallized plastic film, each sheet having outer selvages, the outer selvages bonded to each other to form at least one sealed air pocket therebetween;
   wherein the metallized plastic film is selected from the group consisting of metallized nylon, metallized polyethylene, metallized polyester, metallized polypropylene, metallized polycarbonate, metallized polysulfone and mixtures thereof.

2. The steering wheel cover of claim 1 wherein the overlying front panel and the secondary rear panel each have at least one curved outer region essentially corresponding to steering wheel curvature.

3. The steering wheel cover of claim 2 wherein the secondary rear panel and the overlying front panel are joined to one another along their respective curved outer edge regions.

4. The steering wheel cover of claim 2 wherein the secondary rear panel has an opposed edge opposite the curved outer edge region of the secondary rear panel, the opposed edge freely overlying a central region of the overlying front panel.

5. The steering wheel cover of claim 4 wherein the opposed edge of the secondary rear panel has centrally located indentation configure to releasably contact a base of the steering wheel contained therein.

6. A steering wheel cover removably positionable on a steering wheel, the steering wheel cover, comprising:
   an overlying front panel having an outer edge and outer dimensions larger than the steering wheel;
   a secondary rear panel attached to the overlying front panel, the secondary rear panel and overlying front panel defining a steering wheel receiving pocket into which the steering wheel can be slidably and releasably received;
   the overlying front panel and the secondary rear panel each constructed from at least two sheets of metallized plastic each having outer selvages, the outer selvages bonded to each other to form at least one large air pocket in the overlying front panel and at least one large air pocket in the secondary rear panel;
   the overlying front panel further comprising an intermediate insulating sheet located in the large air pocket between the metallized plastic sheets of the overlying front panel, the intermediate insulating sheet comprising a synthetic material base, an overlying layer bonded thereto, a plurality of individually sealed air pockets defined by the synthetic base and the overlying layer bonded thereto.

7. The steering wheel cover of claim 6 wherein the overlying front panel and the secondary rear panel each have at least one curved outer edge region essentially corresponding to steering wheel curvature.

8. The steering wheel cover of claim 7 wherein the secondary panel and the front panel are joined to one another along their respective curved outer edge regions.

9. The steering wheel cover of claim 3 wherein the secondary panel has a curved outer edge joined to the curved outer edge of the front panel, and an opposed edge freely overlying a central region of the front panel.

10. The steering wheel cover of claim 6 wherein the opposed edge of the secondary panel has a centrally located indentation configured to releasably receive a base of the steering wheel therein.

11. The steering wheel cover of claim 6 wherein the intermediate insulating sheet is comprised of a flexible base and an overlying layer bonded thereto in a plurality of locations, the intermediate sheet having a plurality of individual sealed air pockets formed thereon.

12. A steering wheel cover removably positionable on a steering wheel, said steering wheel cover comprising:
   an overlying front panel having an outer edge and outer dimensions larger than the steering wheel and at least one region of the outer edge having a curve corresponding to curvature of the steering wheel;
   a secondary rear panel having an outer edge having a curved region corresponding to curvature of the curved region of the overlying front panel at the respective curved regions forming a steering wheel receiving pocket into which the steering wheel can be slidably and releasably received;
   the overlying front panel and secondary rear panel each comprising at least two sheets of metallized plastic having outer salvages, the outer salvages bonded to one another to define at least one large sealed air pocket;
   the overlying front panel further comprising an intermediate insulating sheet contained within the large sealed air pocket defined by the metallized plastic sheets and anchored thereto, the intermediate insulting sheet comprising a base, an overlying layer bonded to the base, and a plurality of individually sealed air pockets, the individually sealed air pockets defined by and located between the base and the overlying layer of the intermediate insulating sheet.

* * * * *